UNITED STATES PATENT OFFICE.

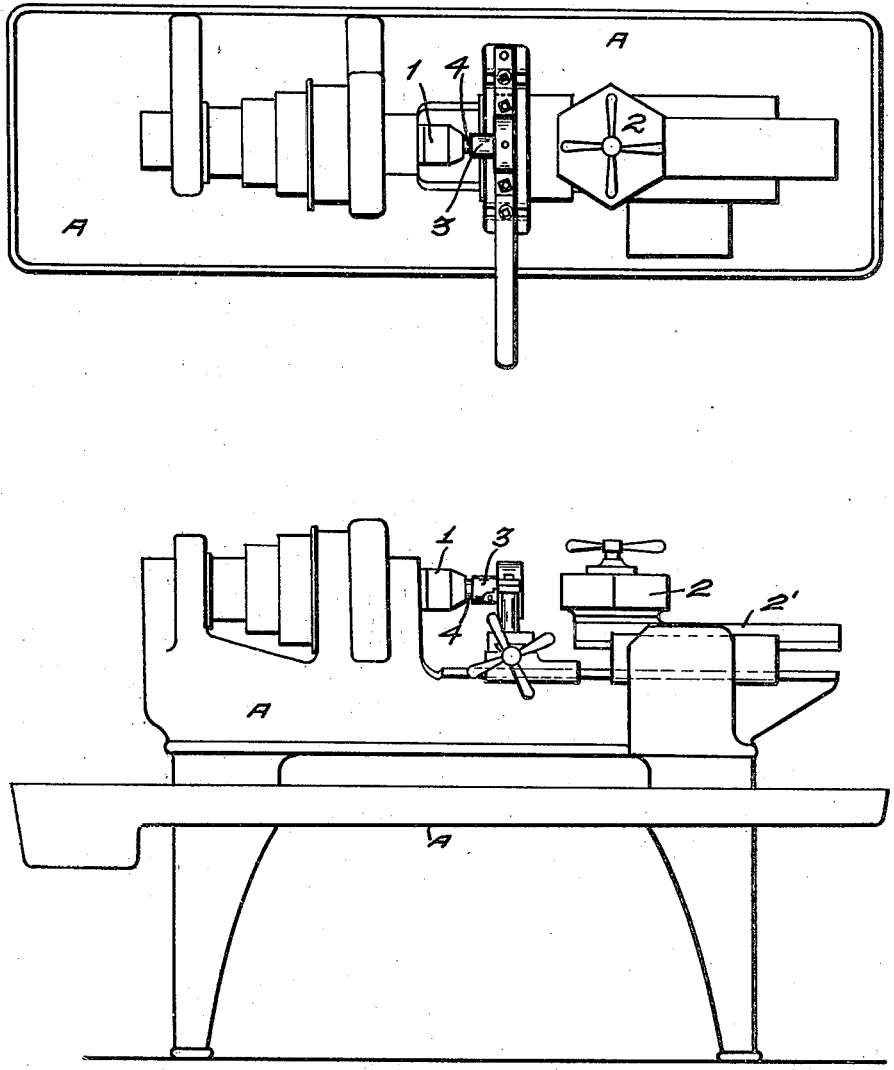

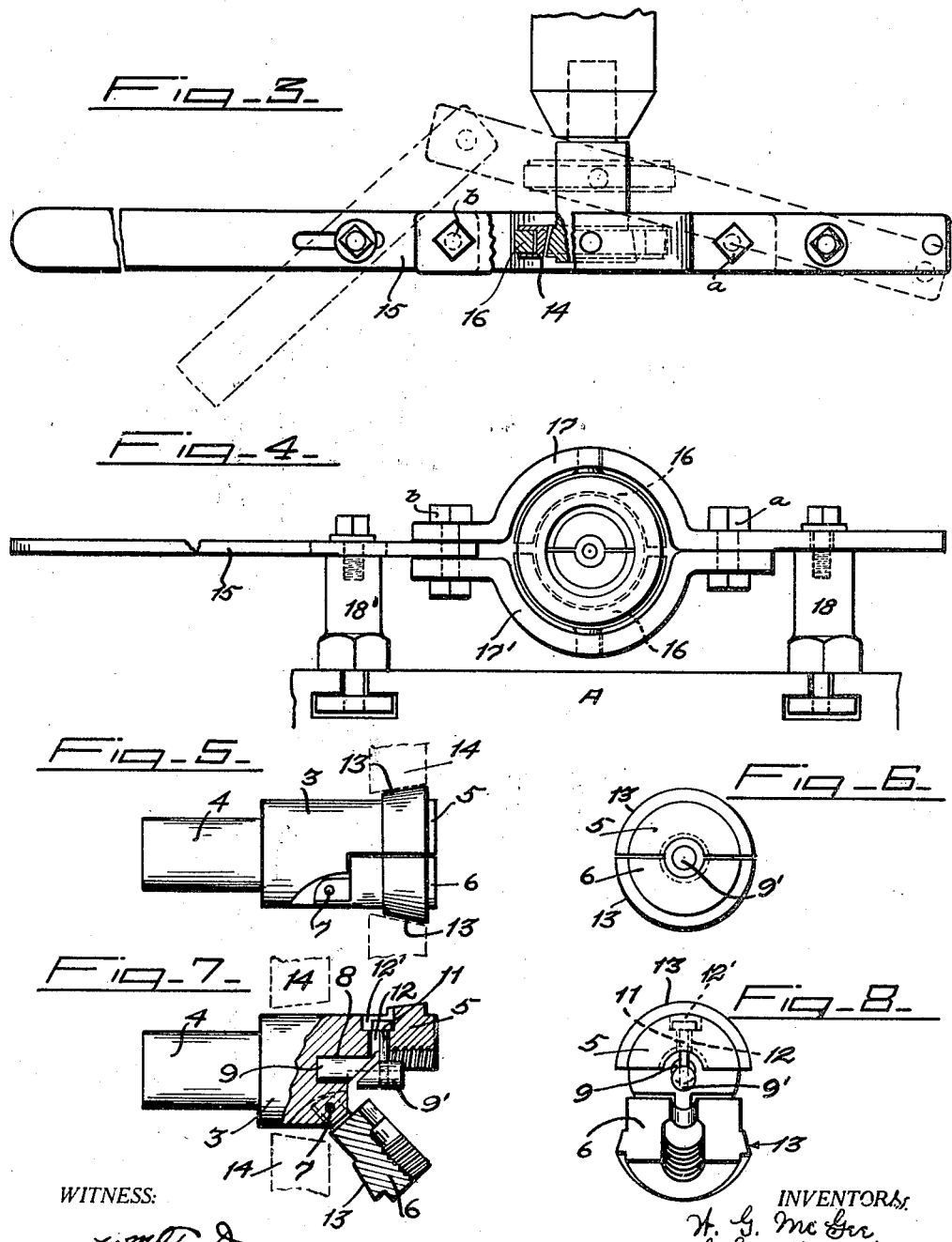

WILLIS G. McGEE AND JOHN FOGARTY, OF SAN FRANCISCO, CALIFORNIA.

HOLD-ON ATTACHMENT FOR STUDS.

1,326,075. Specification of Letters Patent. Patented Dec. 23, 1919.

Application filed October 2, 1918. Serial No. 256,531.

*To all whom it may concern:*

Be it known that we, WILLIS G. McGEE and JOHN FOGARTY, citizens of the United States, residing at the city and county of San Francisco and State of California, have invented certain new and useful Improvements in Hold-On Attachments for Studs, of which the following is a specification.

The hereinafter described invention relates to a stud hold-on attachment for use in connection with screw-thread cutting machines, the object thereof being the production of a simple, effective and inexpensive device capable of attachment to any of the standard screw-thread cutting machines, and by means of which the second threading operation of the studs may be quickly performed and the studs when so threaded automatically discharged or ejected from the hold-on attachment.

Ordinarily, in order to perform the second threading operation of the studs it is required that the threaded end of the stud be first screwed into the threaded seat of the stud holder of the screw-threading machine, after which the longitudinally movable turret head with its threading dies is fed inwardly to cause its die to engage the unthreaded end of the stud and gradually cut the thread thereon. After the completion of the threading operation, the threaded stud remains screwed within the seat of the stud holder and for the removal thereof it is required to employ suitable means for the unscrewing thereof. The result is that approximately one minute is required to position the stud for the second operation, cut the thread thereon and remove the threaded stud from the stud holder of the screw-threading machine. It is this time consumption in connection with the second threading operation of the stud which the present invention seeks to reduce to a minimum, thereby increasing the output of the machine and by so doing materially reducing the expense of screw threading the studs.

The invention, therefore, resides in the stud hold-on attachment for use in connection with the second threading operation, and by the practicable use of which we have been able to complete the threading of the studs at the rate of four studs per minute, due to the fact that it is not required to screw the stud into the hold-on when positioning the same for threading and to unscrew the same therefrom on the completion of the threading operation.

To comprehend the invention, reference should be had to the accompanying sheets of drawings, wherein—

Figure 1 is a side view in elevation illustrating a standard form of screw threading machine, disclosing the invention applied thereto.

Fig. 2 is a top plan view of the mechanism disclosed by Fig. 1 of the drawings.

Fig. 3 is a plan view of the stud hold-on applied to the chuck head of the machine, disclosing the actuating lever for the hold-on partly broken away, the position of said lever when thrown to release the hold-on being illustrated in dotted lines.

Fig. 4 is a front elevation of the parts disclosed by Fig. 3 of the drawings.

Fig. 5 is a detail view of the stud hold-on in closed position, the wedge-ring therefor being disclosed in dotted lines.

Fig. 6 is a front elevation of the stud hold-on.

Fig. 7 is a view similar to Fig. 5, partly broken away, illustrating the stud hold-on in open position, and the wedge ring in dotted lines and in its innermost position.

Fig. 8 is a front elevation of the stud hold-on in open position.

In the drawings, the reference letter A is used to designate any suitable well known form of a screw threading machine and which is provided with the usual chuck head 1 and the turret head 2, the latter being carried by the longitudinally slidable carrier 2' and the said turret in turn carrying the usual threading dies; these parts being of well known construction call for no specific or detail description herein and form no portion of the present invention.

The stud hold-on comprises a suitable head 3 provided with a reduced stem 4, which stem is adapted to be received and held within the chuck head 1, and said head 3 is provided with an outwardly projected fixed internally screw threaded semi-circular jaw 5 and further provided with a swinging semi-circular internally threaded jaw 6, which latter jaw is pivoted to the head 3 at the point 7.

The head 3 is downwardly inclined for a portion of its distance from the rear extremity of the interiorly screw-threaded portion of the jaw 5, Fig. 7 of the drawings, and there is formed in said head a recessed seat 8 which receives a pin 9 downwardly inclined at its outer end. There is held to the jaw section 5 an ejector 9', which at its inner end is cut away at an incline to register with the inclined end of the pin 9, when the ejector 9' is forced inwardly. The said ejector 9' is held to the jaw 5 and prevented from falling therefrom by means of the headed screw bolt 11 which extends through a vertical bore 12 and the head thereof resting within the enlarged portion 12' of the said bore, the lower end of the bolt 11 screwing into the ejector 9'. The ejector is thus held suspended within the jaw 5 and is not moved upwardly until the jaw 6 is closed or swung upwardly relative to the jaw 5 and when acted on by the said jaw the ejector moves on the inclined section of the pin 9 and by so doing will exert an outward strain on the stud held between the clamp jaws as hereinafter set forth. The outer face of the jaw 5 and the jaw 6 is formed or provided with the cam surface 13 which is acted upon by the cam ring 14 when thrown outwardly by the actuating lever 15.

When the hold-on is in an open position, as disclosed by Figs. 7 and 8 of the drawings, the cam ring 14 stands in an inward position relative thereto and loosely surrounds the head 3, Fig. 7 of the drawings.

The cam ring 14 rotates with the head 3 when the same is thrown to engage the jaws 5 and 6 to hold the same in closed position, and the said ring is held in position relative to the shifting lever 15 by means of the segmental shoes 16, which shoes are trunnioned to the ring plates 17 and 17', the ring plate 17 being pivoted to a suitable support 18 upwardly projected from the frame of the machine A, Fig. 4 of the drawings, and to the ring plate member 17 is secured at one end the ring plate 17' by means of the securing bolt $a$, the free ends of the said plates 17 and 17' being secured by means of the bolt $b$ to the inner end of the lever 15, which lever is fulcrumed to the standard 18' upwardly projected from the frame of the machine A.

In the work of performing the second threading operation of a stud, the threaded end of the stud is forced against the ejector 9' to move the same inwardly to place its inclined end in contact with the inclined section of the pin 9. The pivoted jaw 6 is then swung upwardly so as, in conjunction with the jaw 5, to embrace the threaded end of the stud, the lever 15 being thrown to move outwardly the cam ring 14 and to cause the same to ride on the cam surface 13 of the jaws 5 and 6, and by so doing forcing the jaws firmly together to clamp the threaded section of the stud between the interior threads thereof. The forcing inwardly of the stud places the inclined end of the ejector 9' against the inclined face of the pin 9, while the raising of the hinged jaw section 6 causes the ejector to ride upwardly on said inclined surface and by so doing exerting an outward pressure against the stud to be threaded. When the parts are thus clamped, rotation is imparted to the chuck head 1 in the usual manner, which rotates the head 3. The threading die of the gradually inwardly moving turret 2 acts on the projecting metal of the unthreaded portion of the stud held within the hold-on in the same manner as it operates at the present time to thread a stud.

After the completion of the operation of threading the stud, the turret 2 is moved away and the lever 15 thrown to disengage the cam ring 14 from the jaws 5 and 6 when the jaw 6 falls by gravity to the position illustrated by Fig. 7 of the drawings. As the jaw 6 lowers, the ejector 9 moves downwardly and outwardly and by so doing ejects or forces the threaded stud from within the sphere of the hold-on attachment.

It will be noted from the foregoing that it is not required to screw the stud into the threaded jaw section of the hold-on, nor is it required, after the completion of the second operation of threading the stud, to employ a wrench, spanner or other tool to unscrew the stud from within the hold-on, inasmuch as the stud is positioned by hand and is automatically ejected from within the stud hold-on on the completion of the second operation work thereon.

We have found from practical operation of the foregoing described stud hold-on that we are enabled to perform the second threading operation on studs at the rate of four or five studs per minute as against one stud per minute by the use of the machinery at present employed to perform the second threading operation of the stud.

While we prefer to employ the form of ejector illustrated and described herein, it is obvious that various forms of ejectors may be employed for ejecting the completed stud on a release of the hinged jaw section 6 of the stud hold-on attachment.

While we have illustrated and described the invention in its preferred embodiment of working parts, we do not wish to be understood as limiting ourselves to such detailed constructive features, desiring on the contrary to claim the invention as broadly as the state of the art will permit.

Having thus described our invention, what we claim as new and desire to protect by Letters Patent is:—

1. A stud hold-on attachment for use in performing the second threading operation of studs, the same comprising a hold-on head provided with a fixed jaw extension and a pivoted jaw extension, of means for holding the jaws in closed relation for the clamping of a stud therebetween during a threading operation, and an ejector carried by the fixed jaw and independent of the movable jaw for ejecting a stud from within the sphere of the jaws on a release of said jaws.

2. A stud hold-on attachment for the described purpose, the same comprising a stationary jaw and a pivoted jaw, of means for controlling the closing and opening movements of said jaws, and an ejector associated with the jaws and adapted for movement independently of the movable jaw for ejecting a stud therefrom on the opening thereof.

3. A stud hold-on attachment for the described purpose, the same comprising a head provided with a plurality of clamping jaws at least one of which is pivoted thereto, devices associated with said head for controlling the closing and opening of said jaws, and an ejector independent of said jaws and held between the same and with which the end of the stud contacts when held between said jaws, said ejector adapted for ejecting a stud from between said jaws on the opening thereof.

4. The combination with a hold-on head, of means provided with a bore for receiving the threaded end of a stud for holding the same clamped thereto during the second threading operation of a stud and releasing the stud on the completion of said operation, and an ejector capable of movement longitudinally and transversely of said bore and with which the inner end of said stud engages when received in said bore, said ejector adapted for automatically ejecting the threaded stud from said bore on a release of the clamping means.

5. A stud hold-on attachment for the described purpose, the same comprising a head provided with a stationary jaw and a pivoted jaw, said head provided with an interiorly threaded longitudinally disposed bolt receiving recess a portion of which is formed in each of said jaws and the base of said recess being on an incline, an ejector within said recess and capable of movement longitudinally and transversely of said recess, and provided with an inclined rear wall to coöperate with the inclined rear wall of said recess.

In testimony whereof we have signed our names to this specification in the presence of two subscribing witnesses.

WILLIS G. McGEE.
JOHN FOGARTY.

Witnesses:
 HARRY A. TOTTER,
 D. B. RICHARDS.